United States Patent [19]

Hardy

[11] 4,450,350
[45] May 22, 1984

[54] LOW SPEED LASER SCANNING APPARATUS

[75] Inventor: James A. Hardy, Cambridge, Ohio

[73] Assignee: NCR Corporation, Dayton, Ohio

[21] Appl. No.: 392,448

[22] Filed: Jun. 28, 1982

[51] Int. Cl.³ ............................................. G06K 7/10
[52] U.S. Cl. .................................... 235/467; 235/462
[58] Field of Search ............... 235/462, 467; 250/555, 250/566; 350/3.71, 6.7, 6.8

[56] References Cited

U.S. PATENT DOCUMENTS 3,818,444  6/1974  Conniell ............................. 235/467
3,972,583  8/1976  Lobb .................................... 350/6.8

Primary Examiner—Harold I. Pitts
Attorney, Agent, or Firm—J. T. Cavender; Wilbert Hawk, Jr.; Richard W. Lavin

[57] ABSTRACT

Apparatus for generating a scanning pattern for the omni-directional reading of bar code indicia. In one embodiment, a rotating mirror assembly is imaged onto itself by a lens and mirror combination which introduces a light displacement of the image resulting in the displacement of the input beam from the angle of incidence on the mirror of the input beam. Using an array of such lenses and mirrors, a plurality of spatially displaced light beams of substantially equal power are generated without the use of specialized beam-splitting coatings for use in the generation of a scan pattern. In a second embodiment, the array of mirrors deflects a laser beam two or more times at the same facet of a rotating mirror assembly to increase the angular velocity of the deflected beams, thereby enabling the mirror assembly to be rotated at a lower speed while still maintaining the required angular velocity of the deflected output beam.

18 Claims, 8 Drawing Figures

LOW SPEED LASER SCANNING APPARATUS

BACKGROUND OF THE INVENTION

The present invention relates generally to electro-optical scanning systems adapted to sense a bar-code pattern for generating data representing digital signals and more particularly, to a low cost scanning apparatus for generating scanning beams used in scanning a bar code pattern.

In present-day merchandising point-of-sale operations, data pertaining to the merchandised item purchased is obtained by reading data encoded indicia such as a bar code printed on the merchandised item. In order to standardize the bar codes used in various point-of-sale readout systems, the grocery industry has adopted a Universal Product Code (UPC) which is in the form of a bar code. Various reader systems have been constructed to read this bar code including hand-held wands which are moved across the bar code and stationary optical reader systems normally located within the checkout counter in which the portion of the merchandise item containing the bar code is moved across a window, constituting the scanning area of the counter, which movement is a part of the check-out process just prior to loading the item in a bag or the like.

The stationary scanning systems presently available utilize a rotating mirror for generating a scan pattern used in reading the bar code. Examples of this type of scanning system may be found in U.S. Pat. Nos. 3,916,158, 3,995,166 and 4,057,784. Limitations of this type of scanning structure include tight mechanical requirements due to the high speed rotation of the mirror, which requirements limit the operating efficiency of such scanning apparatuses.

In addition, this type of scanning apparatus by necessity is large in size and weight and therefore high in cost. In order to improve the efficiency of the stationary scanning systems, scanning systems have been suggested in which the light beam reflected from one facet of a rotating multifaceted mirror is reflected back to an adjacent facet, thereby following the facet as it rotates to expand the power of the light beam as it scans towards the edge of the document to be scanned. An example of this type of scanning apparatus may be found in U.S. Pat. No. 4,213,157. While the scanning apparatus of the above-cited United States Patent provides the intended scanning operation, the construction is very complex and therefore high in cost. It is therefore an object of this invention to provide an improved low cost scanning apparatus for generating a multi-line scan pattern in a bar code reader. It is a further object of this invention to provide an improved low cost scanning apparatus which generates a plurality of scanning light beams used in forming a scan pattern using a single light source. It is another object of this invention to provide an improved low cost scanning apparatus which generates a complex scan pattern at maximum power throughput and speed.

SUMMARY OF THE INVENTION

In order to fulfill these objects, a scanning apparatus is disclosed which includes a first rotating multifaceted mirror in which a laser beam is deflected off one of the facets of the mirror towards a first stationary mirror which in turn reflects the light beam back at the same facet. Due to its rotational movement, the facet will redirect a stationary light beam at a second rotating mirror. Due to the rotation of the first mirror, a plurality of stationary light beams are generated which, when directed at the second rotating mirror, results in the generation of a plurality of scanning light beams used by a mirror system for producing a scanning pattern to which a coded label is directed. The reflected light beams from the scanned label are directed at the second rotating mirror which redirects the light beams at a detector. A second embodiment of the scanning apparatus is disclosed in which a plurality of first mirrors are orientated to direct the reflected light beams at the same facet of a mirror which had intercepted the laser beam. The facet redirects the reflected light beams at a high angular velocity to a mirror system which produces a multiple scan pattern for scanning the coded label.

BRIEF DESCRIPTION OF THE DRAWING

Additional advantages and features of the present invention will become apparent and fully understood from a reading of the following description, taken together with the annexed drawings, in which.

DESCRIPTION OF THE PREFERRED EMBODIMENT

Figure 1:
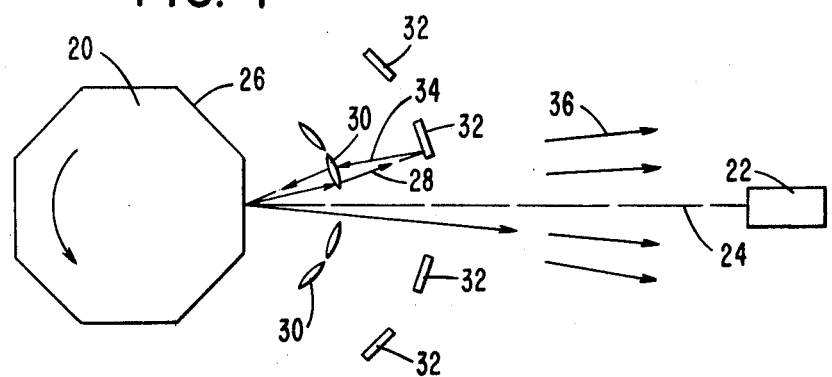
FIG. 1 is a schematic representation of a portion of the two rotating mirrors beam scanning apparatus showing one of the rotating mirrors.
Figure 2:
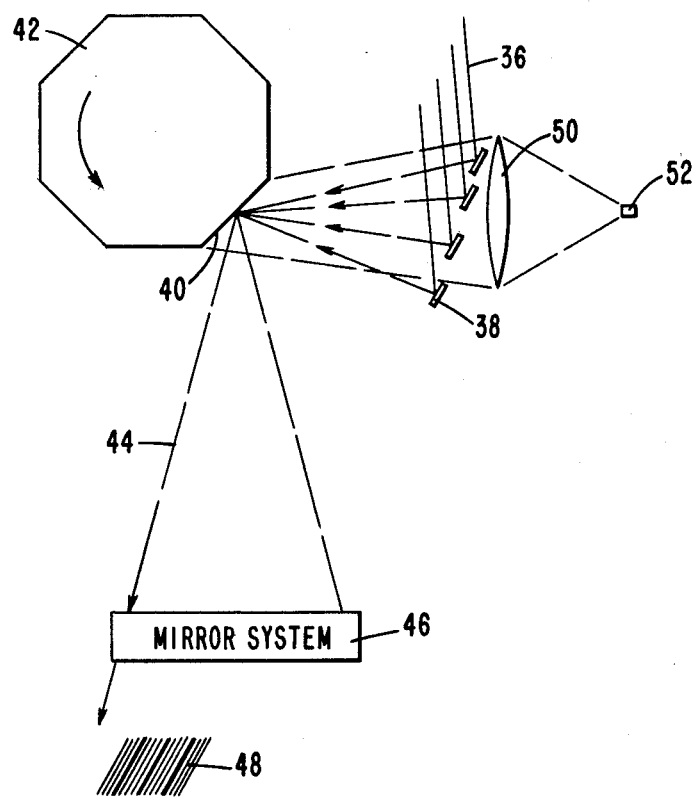
FIG. 2 is a schematic representation of another portion of the two rotating mirror beam scanning apparatus showing the scanning of a coded label by the second rotating mirror.
Figure 3:
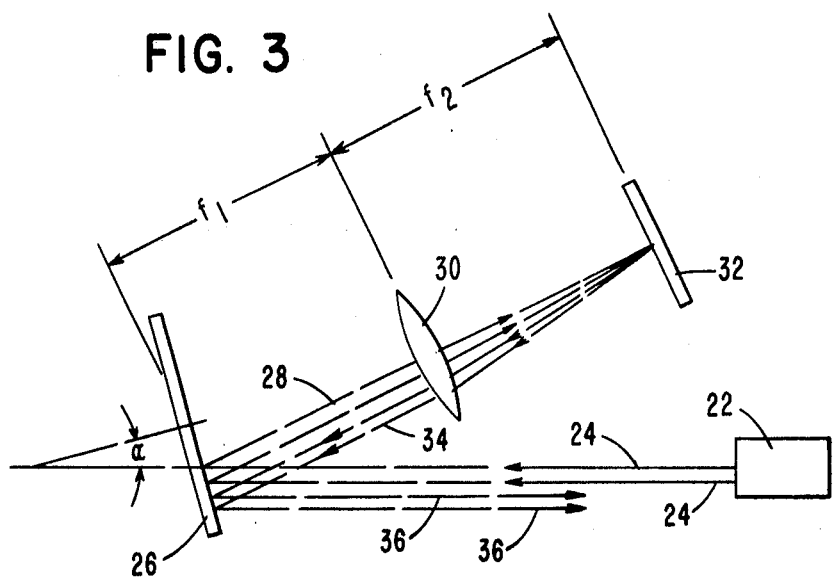
FIG. 3 is a schematic representation of the two rotating mirror beam scanning apparatus showing the relationship of the laser beams as reflected by the facet of the rotating mirror.

Referring now to FIGS. 1-3 inclusive, there is shown schematic representations of one embodiment of the beam scanning apparatus of the present invention. Included in the scanning apparatus is a multifaceted mirror 20 rotating in a counterclockwise direction as indicated by the arrow shown in the drawing. Associated with the mirror 20 is a source of laser beams such as a helium-neon laser 22 which outputs a high spectral radiance light beam 24. It is to be understood that the aforementioned laser 22 is cited as one example of a laser that may be employed in the utilization of the present invention and that any other type of laser generating the required light beam may be used. The light beam 24 is directed so as to impinge on one of the facets 26 of the rotating mirror 20 which reflects a light beam 28 in a direction which is offset to the original direction of propagation of the light beam 24 due to the rotational displacement of the facet 26. The reflected light beam 28 is directed at one of a plurality of focusing lenses 30 which focuses the light beam on one of a plurality of stationary mirrors 32 orientated so as to reflect a light beam 34 back through the lens 30 which focuses the light beam at the surface of the facet 26 of the mirror 20. The focusing of the light beam on the mirror 20 by the lens 30 results in the angular change produced by the rotation of the facet 26 of the mirror being subtracted from the net angle of orientation of an output light beam 36. The use of the stationary mirror 32 adds to the orientation of the light beam 36 in angular displacement due to the orientation of the mirror 32. The resulting light beam 36 reflected from the facet 26 is then used in scanning a coded label in a manner to be described hereinafter. As the mirror rotates in the counterclockwise direction, a plurality of serially-produced light beams 36 will be generated, each being of equal power and displaced from the incident beam 24 by an amount dependent on the orientation of the mirror 32.

As shown in FIG. 2, the output light beams 36 are directed at a plurality of second stationary mirrors 38 which are orientated to direct the reflected light beams 36 at a spot on one of the facets 40 of a second rotating mirror 42 which is rotating in the counter-clockwise direction as indicated by the arrow in FIG. 2. The light beams 44 reflected from the facets 40 are directed at a mirror system 46 which directs the light beams 44 into a scan pattern for scanning a coded label 48. An example of a mirror system that may be utilized in the present invention is that shown in the previously-referenced U.S. Pat. No. 3,916,158. Light beams reflected from the label 48 are directed by the mirror system 46 at one of the facets 40 of the mirror 42 which reflects the light beams towards a focusing lens 50. The focusing lens 50 directs the light beams at a detector member 52 which converts the light beams into electrical signals in a manner that is well-known in the art.

In order to control the direction of the light beams 36, there is shown in FIG. 3 an arrangement in which the facet 26 of the mirror 20 (FIG. 1) is orientated at an angle with the plane in which the laser beam 24 impinges on the facet 26 directing the reflected light beams 28 towards the focusing lens 30 which in turn focuses the light beams 28 at the surface of the stationary mirror 32. The mirror 32 reflects the light beams 34 towards the lens 30, which directs the light beams 34 at the facet 26. Due to the orientation of the mirror facet 26, such facet will direct the parallel light beams 36 in a direction parallel to the laser beams 24 but displaced from the position of such beams 24.

Figure 4:
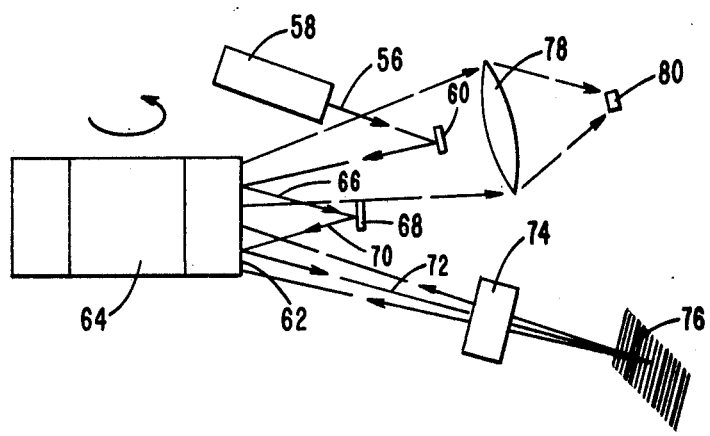
FIG. 4 is a schematic representation of a second embodiment of the beam scanning apparatus in which the light beams are reflected back towards the same facet of the rotating mirror a multiple number of times.
Figure 5:
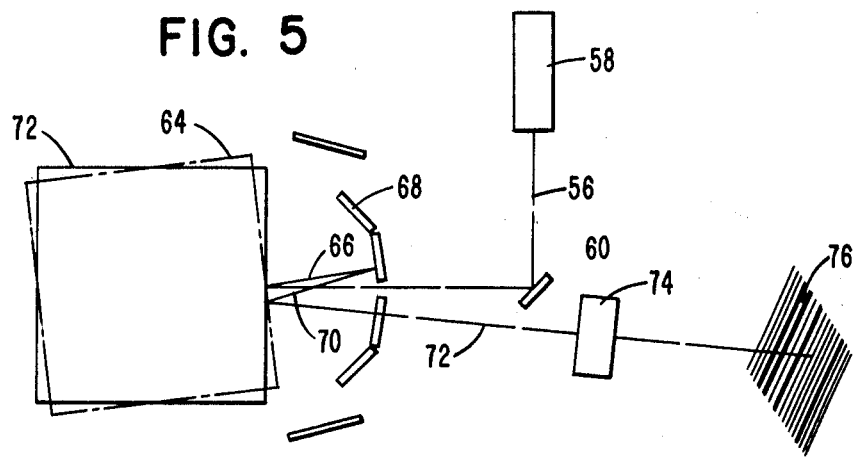
FIG. 5 is a schematic representation of the second embodiment of the beam scanning apparatus showing the orientation of the stationary mirrors with respect to the rotating mirror.
Figure 6:
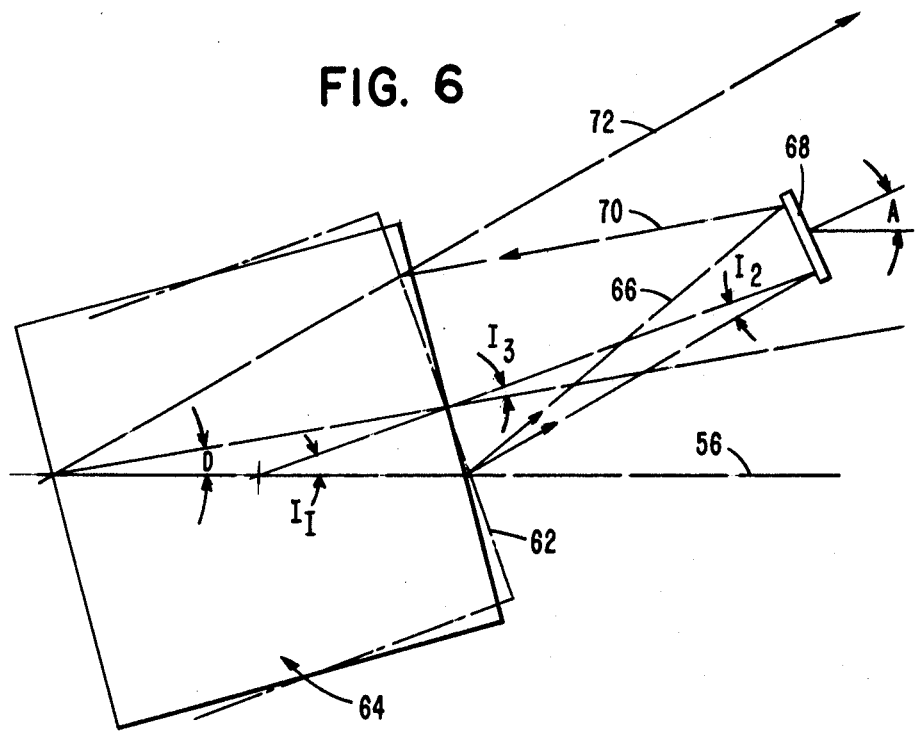
FIG. 6 is a schematic representation of the second embodiment of the beam scanning apparatus showing the relationship of the laser beams as reflected by the rotating mirror.

Referring now to FIGS. 4–6 inclusive, there is shown a schematic representation of a second embodiment of the present invention in which the coherent light beams 56 generated from a laser member 58 are first reflected from a stationary mirror 60 where they impinge on the facet 62 of a multifaceted mirror 64. Facet 62 will direct the reflected light beams 66 at a second stationary mirror 68 which in turn reflects the light beams 70 back at the facet 62. The facet 62 will again reflect the light beams 72 at a mirror assembly 74 which generates a scan pattern through which a coded label 76 passes. The light beams reflected from the label 76 are directed by the mirror assembly 74 at the facet 62 of the rotating mirror 64 which in turn reflects light beams at a collecting lens 78 which focuses the light beams on a detector 80. It will be seen that rotation of the mirror 64 results in a plurality of light beams 72 being directed at the mirror assembly 74, thereby producing a multi-line scan pattern with each line of the pattern comprising one of the reflected light beams 72. Since the velocity of the light or scanning beam 72 depends upon the angular velocity of the beam, the speed of rotation of the mirror 64 will control this angular velocity. By deflecting the scanning beam twice or more from the same facet 62 of the mirror 64, the angular velocity will be increased by a factor which is less than or equal to twice the number of times the light beam is reflected from the rotating mirror. This construction allows the scanning apparatus to produce the same beam velocity with the mirror rotating at a reduced speed, enabling the scanning apparatus to be produced at a lower cost.

As shown in FIG. 5, the stationary mirrors 68 are orientated with respect to the mirror 64 so as to reflect the scanning beams 72 in a direction towards the mirror 74 in response to the rotational movement of the mirror 64. The relationship of the light beams developed in the scanning apparatus of FIGS. 4 and 5 is illustrated in FIG. 6, where the angular velocity D of the reflected light beam is developed as follows:

$$I_1 = wt$$

$$I_2 = 2I_1 - A = 2wt - A$$

$$I_3 = 2I_2 - I_1 = 2(2wt - A) - wt = 3wt - 2A$$

$$D = I_1 + I_3 = 4wt - 2A$$

where
$I_1$ = angle of incidence
$I_2$ = angle of incidence
$I_3$ = angle of incidence
W = angular velocity of the mirror 64
t = time
A = angular orientation of the secondary mirror 68.

Figure 7:
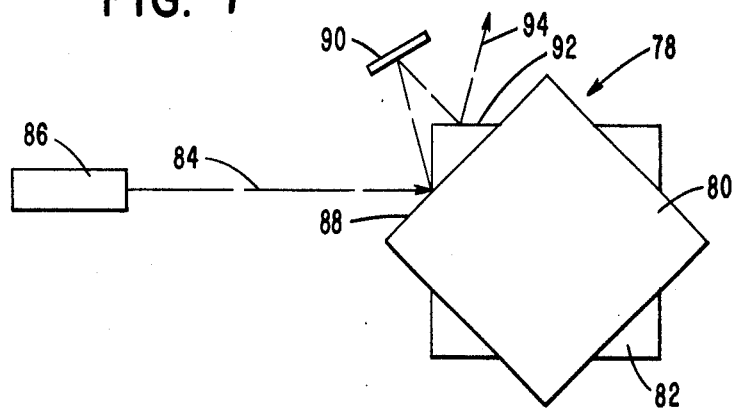
FIG. 7 is a schematic representation of another embodiment of the beam scanning apparatus in which the light beams are deflected off the facets of a pair of offset rotating mirrors.

Referring now to FIG. 7, there is shown another embodiment of the present invention in which a rotating mirror assembly generally indicated by the numeral 78 includes an upper mirror member 80 secured to and offset to a lower mirror member 82 by any desired angle such as 45° as shown. Light beam 84 outputted from a laser member 86 will be directed to a facet 88 of the mirror member 80 which reflects the light beam towards a stationary mirror member 90. The mirror member 90 is orientated with respect to the mirror members 80 and 82 allowing the reflected light beam 84 at the face 92 of the mirror member 82 which reflects the light beam along the path 94 to an appropriate mirror system, such as 42 and/or 46 (FIG. 2) for generating a scanning pattern used for scanning the label 48. It will be seen from this construction that the beam velocity of the scanning light beams can be increased utilizing a very compact mirror system.

Figure 8:
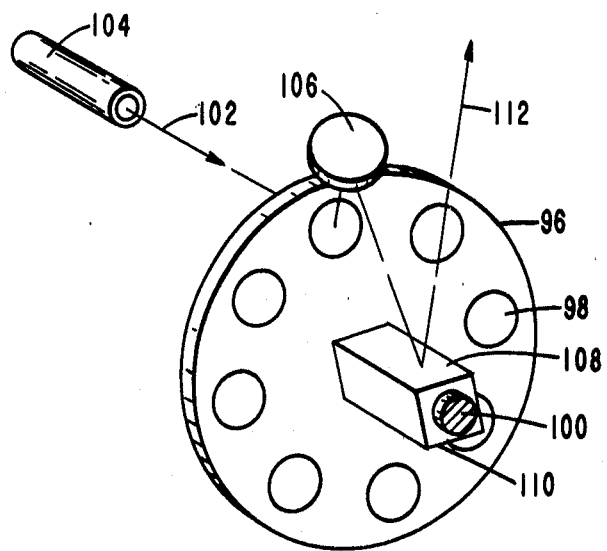
FIG. 8 is a schematic representation of another embodiment of the beam scanning apparatus shown in FIG. 7 in which one of the mirrors has been replaced by a hologram mounted in a rotating disc.

Referring now to FIG. 8, there is shown an embodiment of FIG. 7 in which a rotating disc 96 has mounted therein a plurality of holograms 98 similar in construction to the holograms disclosed in U.S. Pat. No. 4,224,509 which is assigned to the assignee of the present application. As disclosed therein, each of the holograms will diffract an impinging light beam along a different predetermined path to a mirror system which directs the light beams into a scan pattern for scanning a coded label. The disc 96 (FIG. 8) is rotatably mounted on a shaft member 100 to position each of the holograms 98 in the pathway of light beam 102 outputted by a laser member 104. Each of the holograms 98 will direct the light beam 102 towards a stationary mirror 106 which reflects the light beam towards one of the facets 108 of a mirror 110 mounted on the shaft 100. The facet 108 will reflect the light beam 102 along the path 112 to an appropriate mirror system such as 42 and/or 46 (FIG. 2) for generating a coded label scanning pattern similar to that disclosed in the above cited U.S. Pat. No. 4,224,509. By reflecting the light beams against a facet of the rotating mirror 110, beam velocity will be increased allowing the rotational speed of the shaft 100 and disc 96 to be reduced, thus providing a scanning operation which has a longer operational life, is compact in construction and low in cost.

Although only certain preferred embodiments of the present invention have been described herein, it is not intended that the invention be restricted thereto, but that it be limited only by the true spirit and scope of the appended claims.

I claim:

1. A system for scanning coded indicia comprising:
   means for providing a beam of radiant energy;
   a rotating scanning means having a first reflective surface located in the optical path of said beam for reflecting said beam along a first predetermined path;
   first optical means orientated at an angle to said first reflective surface and located in said first predetermined path for reflecting the beam towards said reflective surface which reflects the beam along a second predetermined path;
   and means located in said second predetermined path for directing the reflected beam onto a scan area in the form of a multi-line intersecting scan pattern through which passes the coded indicia to be scanned.

2. The system of claim 1 which further includes means mounted in said first predetermined path for imaging the reflected beam at the surface of said optical means whereby said optical means will reflect the reflected beam back through said imaging means allowing said imaging means to image the beam at said reflective surface which reflects the beam along said second predetermined path.

3. The system of claim 1 in which said directing means includes a second scanning means having a second reflective surface for receiving the light beams along said second predetermined path and reflecting the light beams along a third predetermined path, said directing means further includes mirror means located in said third predetermined path for directing the reflective light beams onto the scan area in the form of a multi-line scan pattern.

4. The system of claim 3 in which said directing means further includes second optical means located in said second predetermined path orientated with respect to said second scanning member for directing the light beams at said second reflected surface.

5. The system of claim 2 in which said imaging means comprises a first lens member constructed to focus a light beam on the surface of said first optical means and the surface of said first reflective surface.

6. The system of claim 5 in which the first reflective surface of said scanning means will reflect a light beam along a third predetermined path upon rotation of the scanning means, such system further includes a second optical means located adjacent said first optical means and positioned in said third predetermined path for directing the light beams at said reflective surface and a second lens member located adjacent said first lens member and constructed to focus a light beam on the surface of said second optical means and the surface of said first reflective surface.

7. The system of claim 6 in which said radiant energy providing means is a laser unit which emits a beam of light having a high level of spectral radiance.

8. A system for scanning data encoded indicia comprising:
   means for generating a beam of radiant energy;
   a first rotating scanning member having a first reflective surface positioned in the path of said beam for deflecting said beams along a first predetermined path;
   a plurality of first optical means orientated at an angle to said reflective surface, one of said first optical means being located in said first predetermined path;
   a plurality of lens members positioned between said reflective surface and said first optical means, and orientated in a direction parallel to said first optical means, one of said lens members being located in said first predetermined path focusing said beam on the surface of said one of said first optical means whereby the first optical means will reflect the radiant energy beam back through said one of said lens members which focuses the beam on said reflective surface resulting in the deflection of the beam along a second predetermined path;
   a plurality of second optical means positioned in said second predetermined path for deflecting the beam along a third predetermined path;
   and rotating means positioned in said third predetermined path for directing the reflected beam onto a scanned area in the form of a multi-line intersecting scan pattern through which passes the data encoded indicia to be scanned.

9. The system of claim 8 in which said first optical means are arcuately orientated to said first reflective surface.

10. The system of claim 8 in which said rotating means includes a second rotating scanning member having a second reflective surface positioned in said third predetermined path to reflect the radiant energy beam along a fourth predetermined path and stationary means located in said fourth predetermined path for directing the reflective beams onto a scanned area in the form of a multi-line intersecting scan pattern through which passes the data encoded indicia to be scanned.

11. The system of claim 10 in which said stationary means directs the light beams reflected from the scanned area towards said second reflective surface wherein the beam is reflected along a fifth predetermined path, said system further includes means located in said fifth predetermined path for detecting the presence of said beam and outputting signals representing the data encoded indicia being scanned.

12. The system of claim 8 in which said radiant energy generating means is a laser unit which emits a beam of light having a high level of spectral radiance.

13. A system for scanning data encoded indicia comprising:

means for generating a beam of radiant energy;

a first multifaceted rotating polygon member having a first reflective facet positioned in the path of said beam for reflecting said beam along a first predetermined path;

a plurality of first stationary reflecting optical members arcuately aligned with respect to said first reflective facet, one of said reflective optical members being located in said first predetermined path during the rotation of said first polygon member;

a plurality of lens members positioned between said first reflective facet and said reflective optical members, each of said lens member being orientated in a direction parallel to one of said reflective optical members and located in said first predetermined path during rotation of said polygon member for focusing said beam upon the surface of one of said optical members enabling the optical member to reflect the radiant energy beam back to said lens member which focuses the beam on said first reflective facet resulting in the reflection of the beam along a second predetermined path;

a plurality of second stationary reflecting optical members, each of which is located in said second predetermined path during the rotation of said polygon member for deflecting the beam along a third predetermined path;

a second multi-faceted rotating polygon member located in said third predetermined path wherein the beam incidents on a second reflective facet of said second polygon member which reflects the beam along a fourth predetermined path;

and means located in said fourth predetermined path for directing the beam onto a scan area in the form of a multi-line intersecting pattern through which passes the data encoded indicia to be scanned.

14. A system for scanning coded indicia comprising:

means for generating a beam of radiant energy along an optical path;

a rotating scanning means having a plurality of first and second deflecting means, said first deflecting means positioned, during rotation of said scanning means, in said optical path for deflecting the beam along a first predetermined path;

optical means orientated at an angle to said first deflecting means and located in said first predetermined path for deflecting the beam towards said second deflecting means which deflects the beam along a second predetermined path;

and means located in said second predetermined path for directing the reflected beam onto a scanned area in the form of a multi-line intersecting scan pattern through which passes the coded indicia to be scanned.

15. The system of claim 14 in which said rotating scanning means includes a support member, means for rotating said support member, said first deflecting means comprising a hologram mounted on said support member and said second deflecting means comprises a multi-faceted polygon member mounted on said rotating means whereby said optical means will deflect the beam from said hologram towards said polygon member wherein one of the facets of said polygon member will deflect the beam along said second predetermined path.

16. The system of claim 15 in which said support member is a disk member on which said holograms are circumferentially mounted, said rotating means comprises a drive shaft secured to said disk member for rotating said disk member and wherein said polygon member is mounted on said shaft member for rotation thereby.

17. The system of claim 14 in which said rotating scanning means includes a first multifaceted polygon member and a second multifaceted polygon member secured to said first polygon member in a juxtaposed position wherein the facets of said first polygon member comprise said first deflecting means and the facets of said second polygon member comprise said second deflecting means, said first polygon member being secured in an offset direction to said second polygon member whereby the face of the facets comprising said first deflecting means are offset to the face of the facets comprising said second deflecting means.

18. The system of claim 17 in which said first polygon member is offset to said second polygon member by 45 degrees.

* * * * *